July 12, 1966  J. LUND ET AL  3,260,278
REGULATING VALVE HAVING REMOVABLE VALVE UNIT
Filed June 14, 1963  6 Sheets-Sheet 1
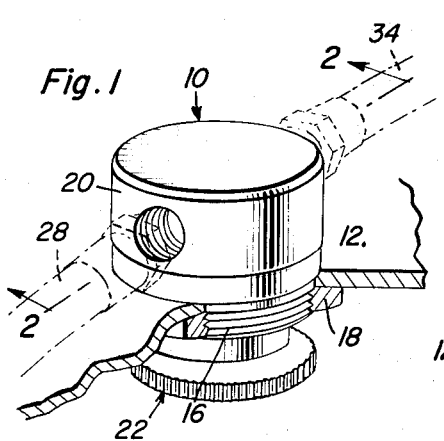
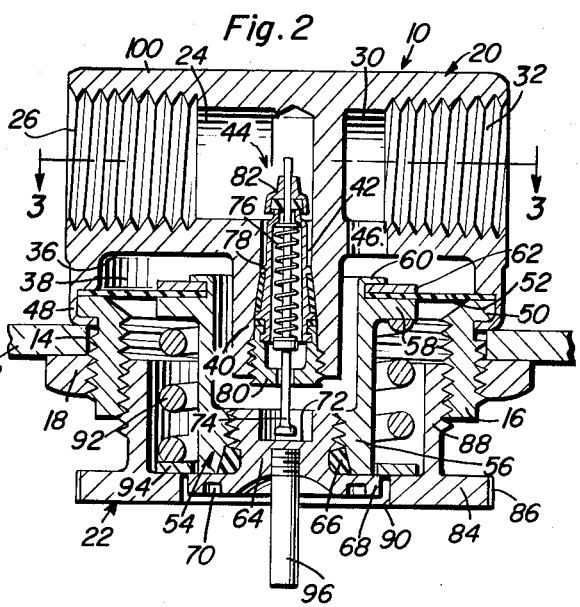
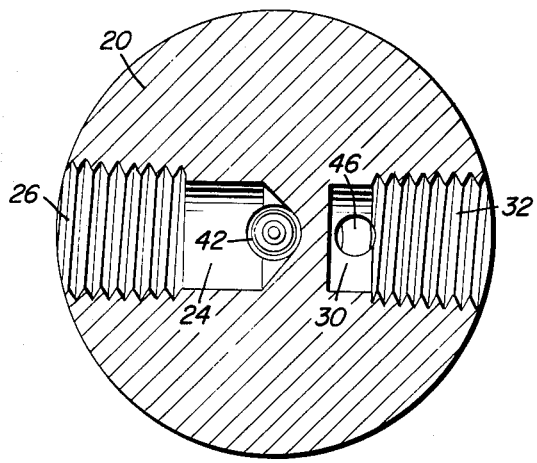
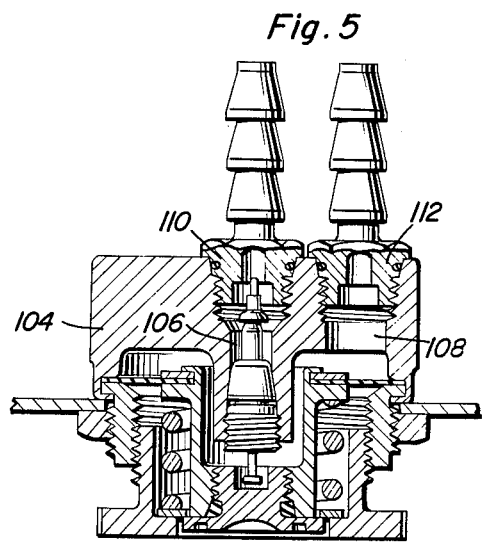
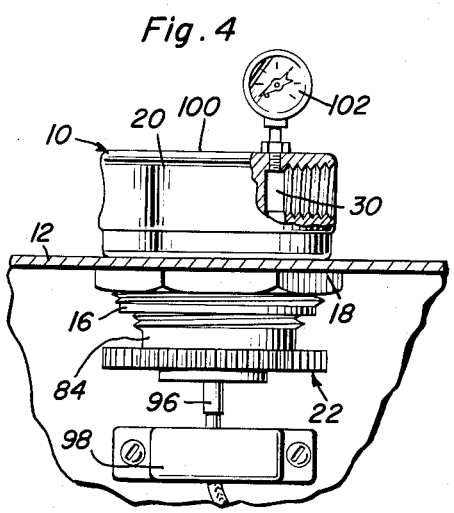
Jens Lund
Carl G. Nilsen
Rudolph Vetere
INVENTORS
BY Clarence A. O'Brien
and Harvey B. Jackson
Attorneys July 12, 1966  J. LUND ET AL  3,260,278
REGULATING VALVE HAVING REMOVABLE VALVE UNIT
Filed June 14, 1963  6 Sheets-Sheet 2
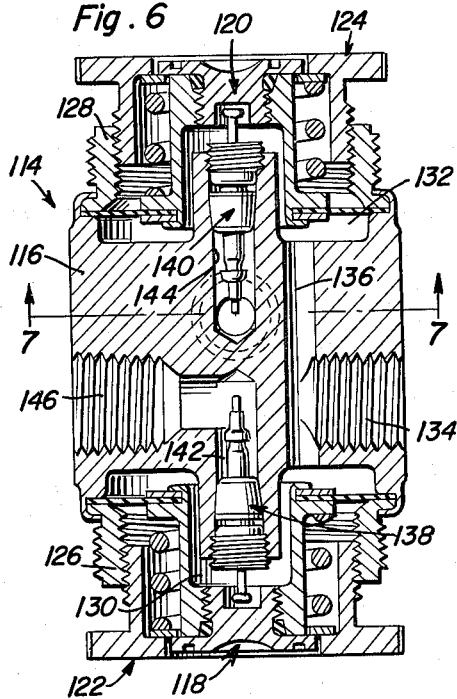
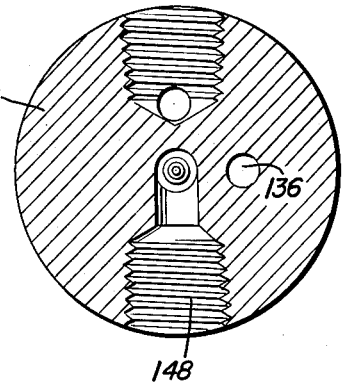
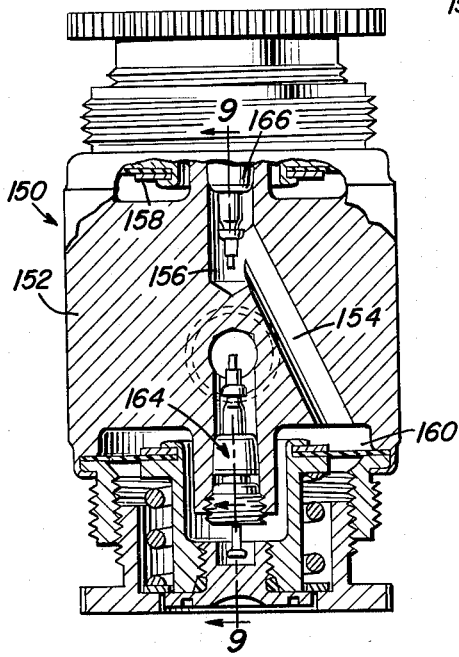
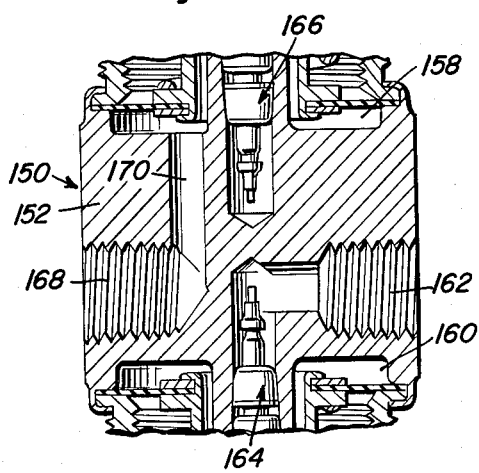
Jens Lund
Carl G. Nilsen
Rudolph Vetere
INVENTORS Jens Lund
Carl G. Nilsen
Rudolph Vetere
INVENTORS July 12, 1966  J. LUND ET AL  3,260,278
REGULATING VALVE HAVING REMOVABLE VALVE UNIT
Filed June 14, 1963  6 Sheets-Sheet 4

Jens Lund
Carl G. Nilsen
Rudolph Vetere
INVENTORS

BY *Clarence A. O'Brien*
*and Harvey B. Jacobson*
Attorneys

July 12, 1966    J. LUND ET AL    3,260,278
REGULATING VALVE HAVING REMOVABLE VALVE UNIT
Filed June 14, 1963    6 Sheets-Sheet 5
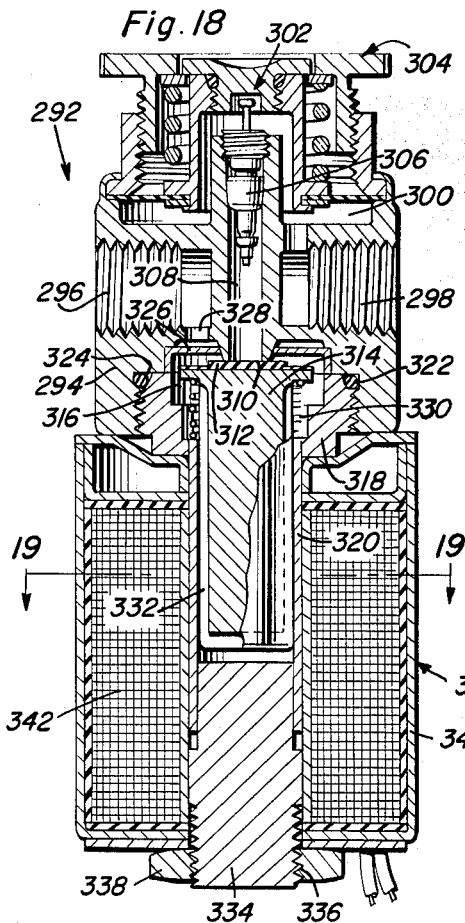
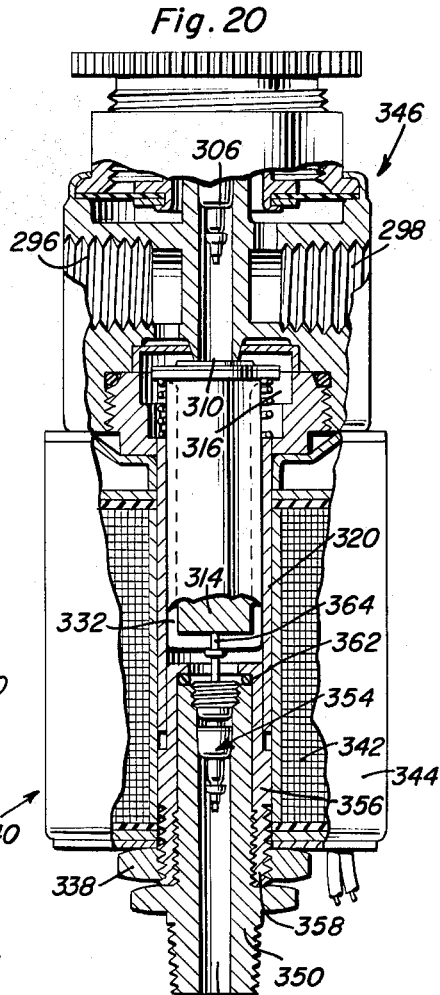
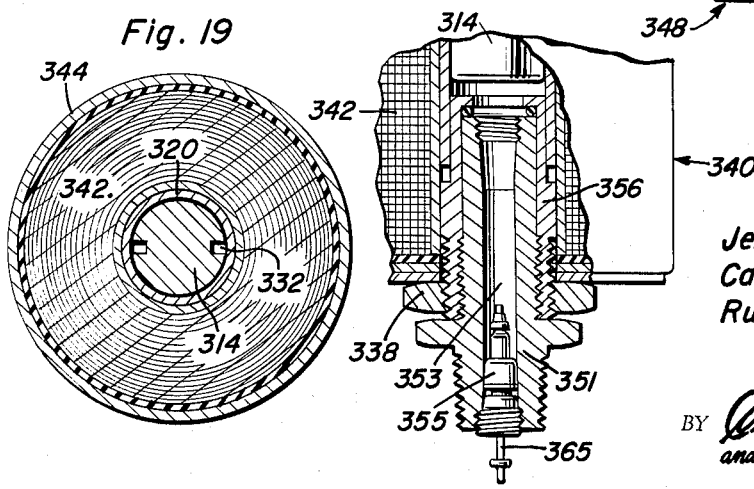
Jens Lund
Carl G. Nilsen
Rudolph Vetere
INVENTORS July 12, 1966 J. LUND ET AL 3,260,278
REGULATING VALVE HAVING REMOVABLE VALVE UNIT
Filed June 14, 1963 6 Sheets-Sheet 6

Jens Lund
Carl G. Nilsen
Rudolph Vetere
INVENTORS

United States Patent Office 3,260,278
Patented July 12, 1966

3,260,278
REGULATING VALVE HAVING REMOVABLE
VALVE UNIT
Jens Lund, Carl G. Nilsen, and Rudolph Vetere, all of Staten Island, N.Y., assignors to Scope Industries, Inc., a corporation of New York
Filed June 14, 1963, Ser. No. 287,880
11 Claims. (Cl. 137—343)

This invention relates to a new and useful regulating valve construction and installation for fluent medium of different types including gases and liquids.

It is therefore a primary object of the present invention to provide a fluid pressure regulator which is extremely versatile with respect to use and installation and also desirable from a dimensional and maintenance standpoint.

An important object of the present invention therefor, is to provide a pressure regulator capable of being easily installed in a fluid pressure circuit and readily adjusted for regulating line pressure in accordance with various requirements without necessitating disassembly or pre-adjustment prior to installation.

Another object of the present invention is to provide a line pressure regulator valve assembly portions of which may be repaired or replaced without requiring complete disassembly.

A further object of the present invention is to provide a pressure regulator of extreme sensitivity and good regulation despite its size, weight and cost.

A still further object of the present invention is to provide a pressure regulating construction capable of being utilized for a variety of different purposes associated with pressure regulation including fluid filtering, multiple port flow control, rapid exhaust, multiple regulation and flow rate and pressure control.

In accordance with the foregoing objects, the pressure regulator of the present invention features a basic valve assembly having a ported valve body adapted to be connected to a source of line pressure and deliver regulated pressure. The valve body is separately assembled with a variable or expansible volume chamber device operative in cooperation with a valve unit removably mounted in the valve body to regulate pressure in accordance with the selective setting of an adjustment assembly that protectively encloses the expansible volume chamber device in assembled relation to the valve body without any sacrifice in the pressure area of the chamber device nor the regulation range of the adjustment assembly. Also, the arrangement is such as to provide easy accessibility to the aforementioned valve unit for removal, repair or replacement thereof without requiring complete disassembly of the regulator. The aforementioned basic constructional features of the regulator are also preserved in connection with the assembly of two or more of such basic regulators with other associated devices including selectively operable solenoid valve devices and filtering facilities.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of a basic regulator valve assembly in a typical installation.

FIGURE 2 is a sectional view of the basic regulator valve assembly taken substantially through a plane indicated by section line 2—2 in FIGURE 1.

FIGURE 3 is a transverse sectional view taken substantially through a plane indicated by section line 3—3 in FIGURE 2.

FIGURE 4 is a side elevational view of the basic valve assembly in another installational environment with parts broken away and shown in section.

FIGURE 5 is a sectional view of a modified form of basic regulator valve assembly for use in connection with different pressure conduit connections.

FIGURE 6 is a double regulator valve assembly particularly useful in regulating the pressure of mixing fluid.

FIGURE 7 is a transverse sectional view taken substantially through a plane indicated by section line 7—7 in FIGURE 6.

FIGURE 8 is an elevational view of a double regulator valve assembly with parts broken away and shown in section, this regulator assembly being particularly useful in connection with sensitive pressure regulation.

FIGURE 9 is a partial sectional view taken substantially through a plane indicated by section line 9—9 in FIGURE 8.

FIGURE 18 is a sectional view through a regulator valve assembly associated with a selectively operable solenoid valve device for flow control purposes.

FIGURE 19 is a transverse sectional view taken substantially through a plane indicated by section line 19—19 of FIGURE 18.

FIGURE 20 is a side elevational view with parts broken away and shown in section of a regulator valve assembly with selectively operable flow control facilities rendered operative to simultaneously provide both regulated and unregulated flow of fluid.

FIGURE 21 is a partial elevational view of a valve assembly with parts broken away and shown in section illustrating a modification of the arrangement shown in FIGURE 20 wherein flow of unregulated pressure fluid is manually controlled.

Figure 10:
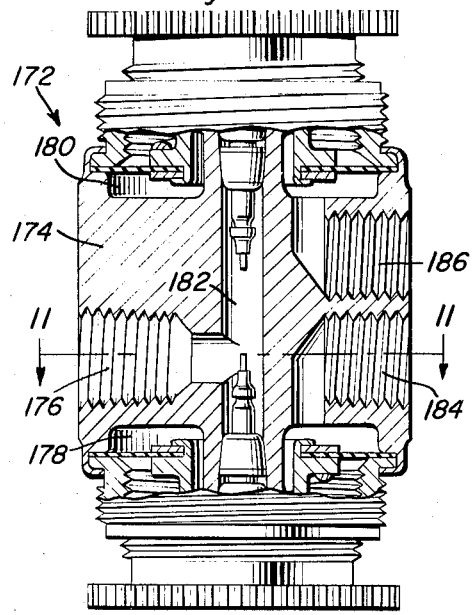
FIGURE 10 is a double regulator valve assembly particularly useful for high flow and sensitive regulation purposes.

Referring now to the drawings in detail, it will be observed from FIGURES 1, 2 and 3, that the basic regulator valve assembly generally referred to by reference numeral 10 is adapted to be mounted on a panel or wall 12 provided with an opening 14 for receiving a mounting collar member 16 therethrough. The collar member 16 is therefore externally threaded for threadedly receiving a lock nut 18 which bears against one side of the mounting panel 12 in order to hold the regulator valve assembly 10 in assembled position on the panel. Accordingly, secured to the collar member 16 and bearing against the mounting panel 12 on the side opposite the lock nut 18, is a valve body generally referred to by reference numeral 20. The valve body 20 is therefore disposed on that side of the mounting panel 12 opposite a pressure adjustment assembly 22 held in assembled relation to the regulator by means of the collar member 16 which is threaded internally for such purpose.

The valve body 20 is provided with an inlet portion 24 which is threaded internally at 26 as shown in FIGURE 2 for receiving the fitting of a line pressure supply conduit 28 as shown by dotted lines in FIGURE 1. Also provided in the valve body in axially spaced alignment with the inlet portion, is an outlet portion 30 also provided with internal threads at 32 for receiving the fitting of an outlet conduit 34 as shown by dotted lines in FIGURE 1 to which fluid at a regulated pressure is supplied. One side of the valve body adjacent to the mounting panel 12 is provided with an annular recess 36 forming a fluid pressure cavity 38. Projecting centrally from the annular recess 36 is a passage portion 40 having a central bore 42 that communicates with the inlet portion 24 and removably receives therewithin a valve unit 44. The pressure cavity 38 formed by the annular recess 36 is also in fluid communication with the outlet portion 30 by means of the passage 46. The pressure cavity 38 is spaced from the mounting panel 12 by means of an annular crimping portion 48 capable of being crimped or deformed for securing the valve body to the flanged portion 50 of the mounting collar 16 in order to secure the annular rim portion of a very thin diaphragm member 52 to the valve body.

The thin diaphragm member 52 forms part of a variable volume chamber device generally referred to by reference numeral 54 that is spaced from and encloses the axially projecting passage portion 40 of the valve body so as to form with the pressure cavity 38, a variable volume fluid pressure chamber. The chamber device 54 therefore includes an annular support housing member 56 having an annular flange portion 58 to which the radially inner portion of the diaphragm member 52 is secured. Accordingly, an annular crimping portion 60 is also connected to the axial end of the housing member 56 adjacent to the valve body adapted to be crimped into engagement with a washer element 62 which bears against the radially inner portion of the diaphragm 52 for securing the diaphragm to the flange portion 58 of the housing member. Thus, the diaphragm member 52 may be formed of relatively thin material secured by crimping to both the housing member 56 and the valve body 20. In this manner, a high degree of sensitivity is achieved in the regulator by substantially eliminating the spring action of the diaphragm member in view of its thinness. The axial end portion of the housing member 56 opposite the diaphragm, is internally threaded for threadedly receiving an end closure member 64. A pressure seal 66 is therefore provided between the extreme axial end of the housing member 56 and the flange portion 68 of the end closure member 64. Recesses 70 may therefore be provided within the flange portion 68 of the end closure member so that tools may be applied for threaded disassembly thereof from the housing member 56. The inner end of the end closure member is also provided with a central recess 72 providing both a pressure surface against which the pressure in the enclosed chamber acts as well as to provide an engaging surface for the valve stem 74 of the valve unit 44.

The valve unit 44 is biased to a closed position by the spring 76 which reacts between the valve stem 74 and the valve housing 78 of the valve unit. The valve housing 78 is therefore positioned within the passage bore 42 and held locked therein by means of the externally threaded mounting member 80 through which the valve stem 74 projects into spaced adjacency to the end closure member 64. It will therefore be appreciated, that when the regulated chamber contracts due to the reduction of pressure therein, the end closure member will engage the valve stem 74 so as to unseat the valve element 82 against the bias of the spring 76 in order to establish fluid communication between the inlet portion 24 and the regulator chamber enclosed by the chamber device 54. Axial movement of the chamber device is of course accommodated by flexing of the thin diaphragm member 52. Accordingly, an adjustable bias is imposed on the chamber device 54 opposed by the pressure in the regulator chamber, by means of the adjustment assembly 22.

The adjustment assembly 22 includes a selectively positioned member 84 that may be manually rotated by grasping the knurled portion 86 thereof so as to axially adjust its position relative to the mounting collar member 16. Accordingly, the adjustably positioned member 84 includes an externally threaded portion 88 which is threadedly engaged with the internal threads of the mounting collar member 16 and is disposed in enclosing relation to the chamber device 54 that axially projects from the valve body 20. The adjustment member 84 is also provided with a central opening 90 through which the end closure member 64 is exposed whereby axial movement of the chamber device 54 is accommodated relative to the adjustment assembly as well as to provide access for removing the end closure member in order to remove and replace the valve unit 44. The axial position of the adjustment member 84 will determine the adjustable bias imposed on the chamber device as aforementioned. Accordingly, an adjustment spring 92 is positioned in encircling relation to the chamber device 54 but bearing at one axial end against the flange portion 58 while the opposite axial end bears against a spring washer 94 seated on the inside of the adjustment member 84. It will therefore be apparent that all of the coils of the adjustment spring 92 are active and are centrally supported in enclosing relation between the adjustment assembly 22 and the chamber device 54. It will also be observed that the chamber device while recessed with respect to its diaphragm member 52, does not involve any reduction in the pressure surface area exposed to the fluid pressure within the regulator chamber.
hatu T From the foregoing description, operation of the pressure regulator 10 as described with respect to FIGURES 1 through 3, will be apparent. The adjustment assembly 22 may therefore be axially positioned by rotation of the member 84 so as to impose a predetermined adjustable bias on the chamber device 54. Thus, the regulator chamber in free communication with the outlet portion 30 of the regulator must be supplied with fluid under sufficient pressure to balance the adjustable bias imposed on the chamber device in order to disengage the valve stem 74 of the valve unit and thereby cut-off fluid communication between the inlet portion 24 and the regulator chamber. When the pressure in the regulator chamber falls below the regulated value however, the adjustment spring 92 will be operative to axially displace the adjustment device into engagement with the valve stem so as to open the valve element 82 of the valve unit in order to establish fluid communication between the line pressure fluid in the inlet portion and the regulator chamber until the pressure therein rises to the regulated value once again. In this manner, expansion and contraction of the regulator chamber volume will maintain a regulated pressure in the outlet portion 30. Relative movement between the chamber device 54 and the adjustment assembly 22 will be accommodated through the opening 90 therein although the chamber device will be protectively enclosed within the adjustment assembly. It will therefore be observed, that the exposed end closure portion 64 of the chamber device may be provided with a control actuator element 96 so that the aforementioned relative movement between the chamber device 54 and the adjustment assembly may be utilized for control purposes. Accordingly, as shown in FIGURE 4, the actuator element 96 may be adapted to engage and actuate some switch device 98. Also, as shown in FIGURE 4, the flat side 100 of the valve body 20 remote from the mounting panel, may mount facilities such as the pressure gauge 102 through which the regulated pressure within the outlet portion 30 may be monitored.

FIGURE 5 illustrates a modified form of the basic regulator valve assembly which is identical in construction and operation to the valve assembly 10 described with respect to FIGURES 1 through 3 except that the valve body 104 is provided with parallel rather than axially aligned inlet and outlet portions 106 and 108. The inlet and outlet portions are therefore internally threaded for receiving inlet and outlet fittings 110 and 112 respectively adapted to provide hose connections to conduits of a different type from those associated with the regulator valve assembly shown in FIGURES 1 through 3. It will therefore be apparent, that the disposition of the valve body of the basic regulator valve construction on the side of the mounting panel opposite the adjustment assembly provides for installational versatility.

The constructional and operational attributes of the basic regulator valve assembly as described with respect to FIGURES 1 through 3, may be utilized in connection with various pressure regulatory functions by the assemblage of two regulator valve arrangements within a common valve body such as the double regulator valve assembly 114 shown in FIGURES 6 and 7. The regulator valve assembly 114 therefore includes a valve body 116 connected on opposite sides thereof to chamber devices 118 and 120 similar in construction and operation to the chamber device 54 described with respect to FIGURES 1 through 3. Also associated with the chamber devices 118 and 120 are separate adjustment assemblies 122 and 124 respectively held in adjusted assembled relation to the valve body by means of the mounting collars 126 and 128. A pair of variable volume regulator chambers 130 and 132 are formed at opposite sides of the valve body, both of the regulator chambers being in fluid communication with an outlet portion 134 by means of a common outlet passage 136 formed in the valve body. Fluid under line pressure is therefore admitted to the regulator chambers 130 and 132 through valve units 138 and 140 respectively which are similar in construction and operation to the valve unit 44 described with respect to FIGURES 1 through 3. Thus, the valve units 138 and 140 are mounted within passage bores 142 and 144 that respectively communicate with separate inlet ports 146 and 148. The double regulator valve assembly 114 is therefore suitable for receiving two separate fluid mediums for mixing and supply at a regulated pressure to the outlet portion 134. It will also be appreciated, that the double valve assembly could be utilized for independent regulation of two different fluid mediums without mixing by merely connecting each of the regulator chambers to separate outlet ports rather than to a common outlet portion.

Referring now to FIGURES 8 and 9, it will be observed that a double regulator valve assembly 150 is provided which is similar in construction and arrangement to the double regulator valve assembly 114 except that the valve body 152 is provided with a series connecting passage 154 between the valve unit mounting passage 156 associated with the regulator chamber 158 and the regulator chamber 160. An inlet portion 162 is therefore in fluid communication with the valve unit 164 for supply of fluid through the regulator chamber 160. The regulated pressure fluid from the chamber 160 is then supplied by the passage 164 to the valve unit 166 so that the fluid may be further pressure regulated within the regulator chamber 158 that is in fluid communication with the outlet portion 168 through passage 170. A more sensitive pressure regulation is thereby obtained with the double regulator assembly 150.

Figure 11:
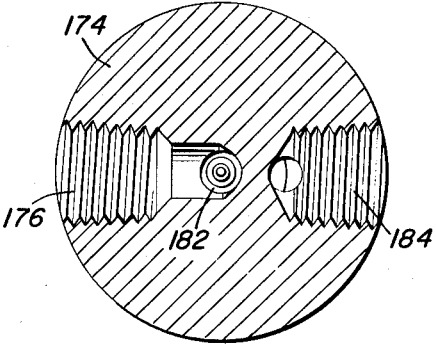
FIGURE 11 is a transverse sectional view taken substantially through a plane indicated by section line 11—11 in FIGURE 10.

Regulation of fluid pressure at a high flow rate may be obtained by use of a double regulator assembly 172 as shown in FIGURES 10 and 11. The double regulator assembly 172 is similar in constructional arrangement to the regulator assemblies 114 and 150 except that the valve body 174 is provided with an inlet portion 176 which is in fluid communication with both regulator chambers 178 and 180 by means of the common inlet pressure supply passage 182. Accordingly, both of the valve units associated with the regulator chambers 178 and 180 are mounted in the fluid pressure passage 182 while separate outlet ports 184 and 186 respectively communicate with the regulator chambers 178 and 180. Therefore, regulated pressures may be effected in two conduits at separate volumetric flow rates. Alternatively, a common outlet portion may be provided in order to obtain a high flow rate in a single conduit at one pressure.

Figure 12:
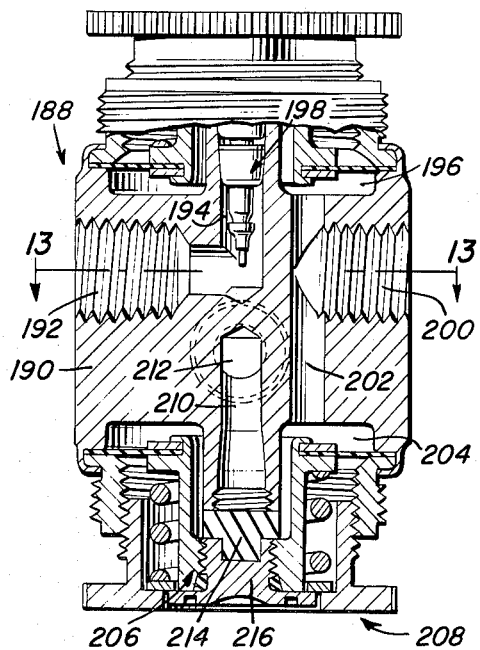
FIGURE 12 is a double valve assembly designed to prevent pressure "creep."
Figure 13:
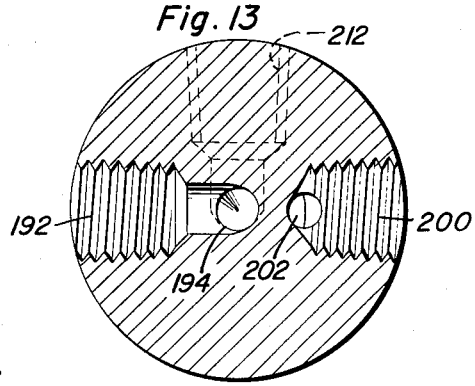
FIGURE 13 is a transverse sectional view taken substantially through a plane indicated by section line 13—13 in FIGURE 12.

The double regulator valve assembly arrangement may also be utilized for controlled exhaust of fluid in connection with pressure regulation. Referring therefore to FIGURES 12 and 13 it will be observed that the double valve assembly 188 is provided with a valve body 190 having an inlet portion 192 in fluid communication with the inlet passage 194 to the regulator chamber 196 through the valve unit 198. The regulator chamber 196 is in fluid communication with the outlet portion 200 through the outlet passage 202 so as to deliver fluid at a regulated pressure thereto. However, the outlet passage 202 also communicates with a variable volume chamber 204 enclosed by chamber device 206 similar in construction and operation to the chamber device 54 described in connection with FIGURES 1 through 3, and associated with an adjustment assembly 208 also constructed and operative in a manner similar to that described with respect to the adjustment assembly 22 in FIGURES 1 through 3. However, the inlet passage 210 associated with the expansible volume chamber 204 is not provided with any valve unit but is in free fluid communication with an exhaust port 212. The exhaust passage 210 is however sealed by a sealing element 214 mounted in the end closure portion 216 of the chamber device 206 so as to ordinarily prevent venting of the chamber 204. It will therefore be apparent that when the regulated pressure supplied by the regulator chamber 196 to the outlet portion 200 exceeds a maximum value, predetermined by the setting of the adjustment assembly 208, the excessive pressure developed within the chamber 204 will cause the chamber device 206 to unseat the seal element 214 so as to vent the regulated pressure through the passage 210 and exhaust port 212 thus preventing pressure "creep."

Figure 14:
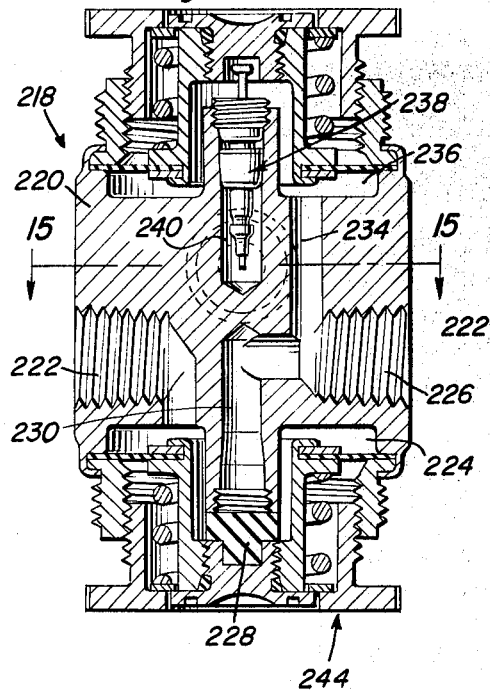
FIGURE 14 is a sectional view through a double valve assembly useful in connection with rapid pressure exhaust.
Figure 15:
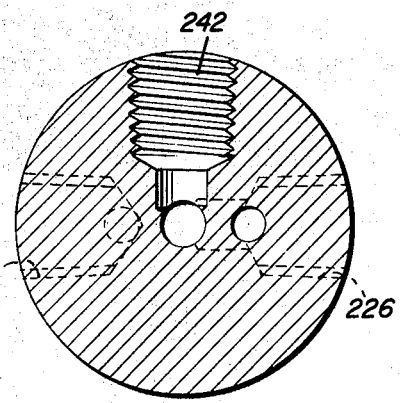
FIGURE 15 is a transverse sectional view taken substantially through a plane indicated by section line 15—15 in FIGURE 14.

Controlled exhaust or venting of regulated pressure for rapid pressure dumping purposes is achieved by the double valve assembly 218 as shown in FIGURES 14 and 15. The constructional arrangement illustrated in FIGURES 14 and 15 is similar to that of the double valve assembly 188 except that the valve body 220 is provided with a vent portion 222 that communicates with the expansible volume chamber 224 which communicates with the outlet portion 226 when the sealing element 228 is unseated. The outlet portion 226 therefore communicates with the chamber 224 through the passage 230 within which no valve unit is mounted while the outlet passage 234 provides fluid communication between the outlet portion and the regulator chamber 236 with which the valve unit 238 is associated. The valve unit 238 when opened will admit fluid to the regulated chamber 236 since the passage 240 within which the valve unit is mounted, communicates with the inlet port 242. It will therefore be apparent, that fluid communication between the vent and outlet portions will be established when the outlet line pressure exceeds the predetermined value as preset by the adjustment assembly 244. Any sudden increase in this outlet line pressure above the regulated value to cause expansion of the regulator chamber 236 is also applied to the sealing element 228 so as to vent the excessive pressure.

Figure 16:
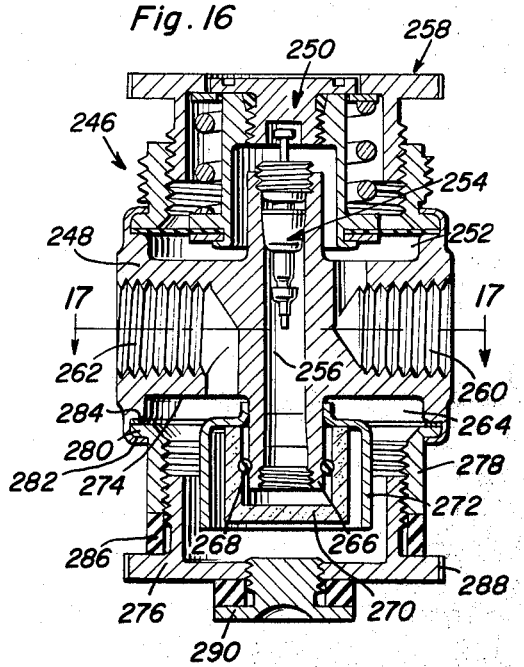
FIGURE 16 is a regulator valve assembly having filtering facilities particularly useful for removal of moisture from a gaseous fluid.
Figure 17:
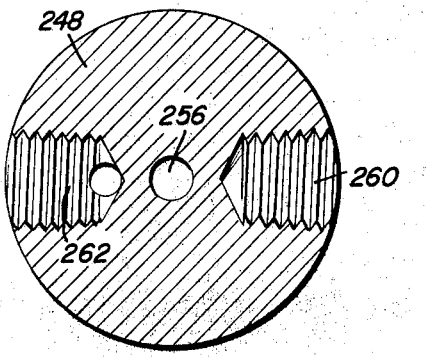
FIGURE 17 is a transverse sectional view taken substantially through a plane indicated by section line 17—17 in FIGURE 16.

The basic regulator valve assembly as disclosed with respect to FIGURES 1 through 3, may also be modified to provide filtering facilities in addition to pressure regulation utilizing a valve body construction similar to that described in connection with the double regulator valve assembly 114, 150, 172, 188 and 218. Referring therefore to FIGURES 16 and 17, it will be observed that the regulator valve assembly 246 includes a valve body 248 one side of which is enclosed by the chamber device 250 to form the variable volume regulator chamber 252 through which the fluid is pressure regulated, the fluid being supplied to the regulator chamber 252 through the valve unit 254 removably mounted within the central passage 256 formed in the valve body. The adjustment assembly 258 is therefore adjustable positioned on one side of the valve body 248 for imposing the adjustable regulatory bias on the chamber device 250 to control the opening of the valve unit 254 so that fluid under line pressure may be admitted therethrough into the regulator chamber 252 which in turn supplies regulated pressure to the outlet portion 260. The inlet portion 262 on the other hand, is in fluid communication with an adjustably fixed volume chamber 264 enclosed on the other side of the valve body 248 opposite the regulator chamber 252. Accordingly, the passage 256 extends through the projecting portion 266 formed with an annular seating groove for an O-ring sealing element 268 which is also seated within an internal annular groove in an enclosing filter element 270. Also mounted on the projecting portion 266 in enclosing relation to the filter element 270, is a moisture shield element 272. The filter element 270 and shield 272 therefore project with the portion 266 of the valve body into the fixed volume chamber 264 formed between the annular recess 274 in the valve body and an adjustable bottom member 276. The adjustable member 276 is therefore axially positioned by threaded engagement with the collar member 278 provided with a flange portion 280 secured to the valve body by means of the annular crimping portion 282. A washer 284 is disposed between the flange portion 280 and the valve body rather than a diaphragm as in the case of the regulator chamber 252. Also, a resilient annular gasket 286 is disposed between the laterally extending knurled portion 288 of the adjustable bottom member 276 and the exposed annular edge of the collar 278. It will therefore be apparent, that by adjustable positioning of the adjustable bottom member 276, the volume of the chamber 264 may be preset to some fixed value. Also threadedly mounted in the adjustable bottom member 276, is a drain plug 290. Also, it will therefore be apparent from the foregoing description of the construction of the regulator valve assembly 246, that fluid under line pressure such as air, when supplied through the inlet portion 262 to the fixed volume chamber 264, enters the central passage 256 after being filtered by the element 270. The regulated fluid may therefore be supplied to the outlet port 260 after it is filtered, utilizing a double regulator assembly-type of construction with one of the regulators modified for filtering purposes.

The regulator valve assembly may also be associated with a selectively operable flow control device disposed on the side of the valve body opposite the regulator chamber. Referring therefore to FIGURES 18 and 19, it will be observed that the regulator valve assembly 292 includes a valve body 294 having an inlet portion 296 axially aligned with an outlet portion 298. The outlet portion is in fluid communication with a regulator chamber 300 formed between one side of the valve body and a chamber device 302 similar in construction and function to the chamber device 54 described in connection with the basic regulator valve assembly 10. Accordingly, also associated with the regulator chamber 300, is an adjustment assembly 304 cooperating with the chamber device to actuate the valve unit 306 by means of which fluid under line pressure is admitted to the regulator chamber through the central passage 308 within which the valve unit 306 is removably mounted. The end of the central passage 308 opposite the valve unit 306, is provided with an inlet valve seat 310 on which a valve element 312 is seated to close off the passage 308. The valve element 312 is mounted on a valve actuating armature 314 movable within a fixed volume pressure chamber 316 that is formed within the valve body 294. The valve body is therefore internally threaded to threadedly receive an annular member 318 which is centrally connected to a cylindrical armature housing 320 that extends away from the valve body. An annular seal 322 is disposed within the internally threaded recess 324 of the valve body and is engaged by the member 318 so as to seal the chamber 316. Also mounted within the valve body in engagement with the member 318, is a filter element 326 operative to filter fluid supplied to the chamber 316 from the inlet portion 296 in communication therewith by the passage 328. The valve mounting armature or plunger 314 is slidably mounted within the armature housing 320 and is biased to a valve closing position by means of a return spring 330 disposed within the chamber 316 and reacting between the armature housing and the armature 314. It will also be observed, the the armature 314 is provided with longitudinal grooves 332 so that fluid supplied to the chamber 316 will completely surround the armature in order to avoid any static pressure bias from being applied to the valve actuating armature. Accordingly, the end of the armature housing 320 remote from the valve body, is closed by means of a plug member 334 having an externally threaded portion 336 adapted to threadedly receive an assembly nut 338.

The valve acutating armature 314 forms part of a selectively operable power operated flow control device generally referred to by reference numeral 340 held in assembled relation on one side of the valve body 294 by means of the lock nut 338 engaged therewith. The power operated flow control device therefore includes a solenoid coil 342 housed within the solenoid housing 344 which surrounds the armature housing 320 and the plug member 334. It will therefore be apparent, that energization of the solenoid coil 342 will withdraw the valve actuating armature 314 against the bias of the return spring 330 in order to open the passage 308 and establish fluid communication between the filtered fluid within the chamber 316 and the passage 308 in order to supply fluid at a regulated pressure to the outlet portion 298.

A combined pressure regulator and flow controlling assembly 346 is shown in FIGURE 20 and is similar in construction and operation to the regulator assembly 292 described in connection with FIGURES 18 and 19 except that the plug member 334 is replaced by a line pressure flow control attachment generally referred to by reference numeral 348. The attachment 348 therefore includes a tubular member 350 provided with a line pressure outlet passage 352 the inner end of which is internally threaded for removably mounting a valve unit 354 similar in construction and operation to the valve unit 44 described in connection with the basic regulator valve assembly 10 or the valve unit 306 associated with the pressure regulating portion of the assembly 346. The tubular member 350 is mounted within the solenoid housing 344 and the end of the armature housing 320 by means of a tubular mounting member 356 that has a threaded portion 358 which threadedly receives the tubular member 350 and the lock nut 338 whereby the attachment 348 is mounted in assembled relation to the flow control device 340. The inner end of the tubular member 350 is therefore in engagement with an O-ring seal 362 held in position by the inner end portion of the tubular mounting member 356, said end portion being provided with an opening through which the valve actuator stem 364 of the valve unit 354 extends for engagement by the armature 314. It will therefore be apparent, that when the solenoid coil 342 is energized to open the flow control valve element 310 associated therewith in order to permit regulation of line pressure, the valve unit 354 will also be opened so as to establish fluid communication between the inlet portion 296 and the line pressure outlet passage 352 through the chamber 316 and the grooves 332 in the armature 314. Accordingly, actuation of the power operated control device 340 will simultaneously provide filtered fluid at a regulated pressure from the outlet portion 298 and filtered fluid at line pressure through the outlet passage 352.

An alternative modification of the attachment associated with the flow controlling device 340, is shown in FIGURE 21 wherein supply of unregulated line pressure is under manual control rather than under the control of the device 340. Accordingly, the attachment associated with the flow control device 340 as shown in FIGURE 21, includes a tubular member 351 similar in construction to the tubular member 350 described in conneciton with FIGURE 20 and mounted within the device 340 in the same manner by means of the tubular mounting member 356. However, no valve unit is located at the inner end of the tubular member for actuation by the armature 314. Instead, a valve unit 355 is mounted at the outer end of the tubular member 351 so that the valve actuating stem 365 thereof may be manually actuated in order to open the valve unit 355 so as to discharge therethrough, filtered fluid at unregulated line pressure from the passage 353.

Figure 22:
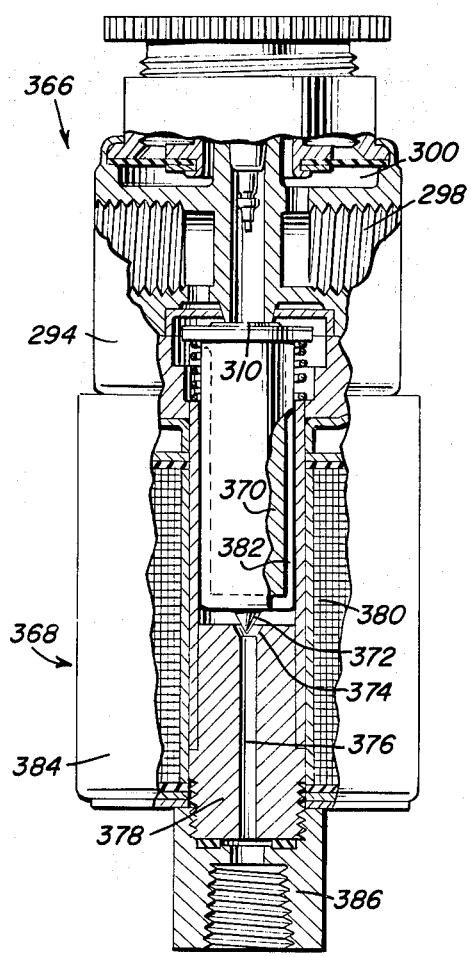
FIGURE 22 is an elevational view of a regulator valve assembly with parts broken away and shown in section including selectively operable flow control facilities for alternatively providing regulated and unregulated pressure flow.

A still further modification or attachment for the flow controlling device 340 is illustrated in FIGURE 22 wherein the combined regulator and flow controlling assembly 366 includes a flow controlling device 368 similar in construction and operation to the flow controlling device 340 described in connection with FIGURES 18 through 21 except that the end of the solenoid armature 370 remote from the valve body 294, is provided with a conical valve element 372 adapted to be seated on a valve seat 374 formed at the upper end of an outlet passage 376 within the valve body member 378. The valve element 372 is therefore seated when the solenoid coil 380 is energized in order to close off the passage 376 from the filtered and unregulated line pressure otherwise supplies thereto through the grooves 382 in the solenoid armature 370. It will therefore be apparent, that the power operated flow controlling device 368 will be operative to alternatively supply unregulated line pressure to the regulator chamber 300 in order to obtain regulated pressure from the outlet portion 298 or supply unregulated line pressure to the outlet passage when cutting off the supply of regulated pressure by the closing of the valve element 310. The valve body member 378 is therefore externally threaded at the end thereof projecting from the solenoid housing 384 in order to threadedly receive a conduit coupling fitting 386 adapted to hold the valve body member 378 in assembled relation within the device 368.

Figure 23:
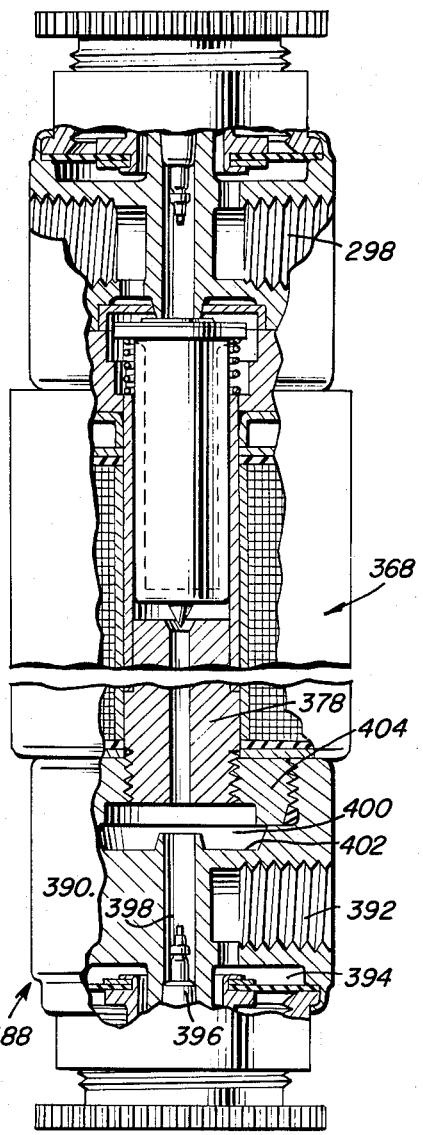
FIGURE 23 is an elevational view of a regulator valve assembly with parts broken away and shown in section including selectively operable flow control facilities for alternatively providing two different regulated pressure flows.

FIGURE 23 illustrates a modification of the assembly described with respect to FIGURE 22 in that the outlet coupling fitting is replaced by a second regulator sub-assembly generally referred to by reference numeral 388. The regulator sub-assembly 388 is similar to the basic regulator assembly 10 described with respect to FIGURES 1, 2 and 3 except that the valve body 390 thereof does not have an inlet portion but only an alternate regulated outlet portion 392 communicating with the regulator chamber 394 which in turn is supplied with fluid through its associated valve unit 396 in the inlet passage 398. Accordingly, the inlet passage 398 of the assembly 388 is in fluid communication with a chamber 40 formed between the annular recess portion 402 of the valve body 390 and a threaded coupling member 404 which secures the valve body 390 to the valve body member 378 projecting from the flow controlling device 368. It will therefore be apparent, that operation of the flow controlling device 368 will be operative to supply regulated pressure fluid alternatively from the outlet portion 298 or the outlet portion 392.

Figure 24:
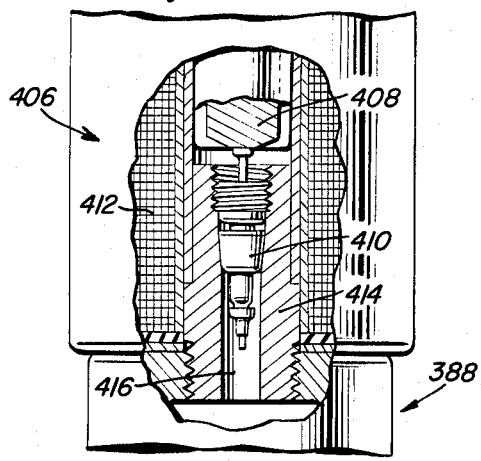
FIGURE 24 is a partial elevational view with parts broken away and shown in section of a valve assembly illustrating a modification of the valve assembly shown in FIGURE 23 whereby two different regulated flows are provided simultaneously.

Regulated pressure fluid may be supplied simultaneously from two outlets when the flow controlling device is energized by means shown in the modified form of combined assembly illustrated in FIGURE 24. Accordingly, the assembly to which FIGURE 24 relates, is identical in construction and operation to the assembly shown in FIGURE 23 except that the solenoid operated flow controlling device 406 is provided with a solenoid armature 408 engageable with a valve unit 410 for opening thereof when the solenoid coil 412 is energized to also open the valve element at its other end. The valve unit 410 is therefore mounted in the tubular member 414 having externally threaded portions projecting from the device 406 for securing thereto the regulator valve sub-assembly 388 similar in construction and operation to that described with respect to FIGURE 23. Accordingly, upon opening of the valve unit 310, filtered fluid at line pressure will be supplied through the passage 416 to the inlet passage of the valve regulator assembly 388 in order to provide regulated fluid pressure from the outlet portion 392 simultaneously with the supply of regulated pressure fluid from the regulator assembly at the other end of the flow controlling device 406.

From the foregoing description, the construction, operation and utility of the regulator assemblies and associated facilities will be apparent. It will therefore be appreciated, that the basic regulator valve assembly and the component parts thereof may be utilized in different combinations with filtering facilities and solenoid operated flow controlling devices to perform a variety of different functions involving pressure regulation. Still further, operational variations may be achieved by the porting of the valve body associated with the regulator assembly of the double regulator type hereinbefore described. Thus, the advantageous attributes described in connection with the basic regulator valve assembly may be extended to and enhance the various installational and operational variations.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A regulator valve assembly comprising, a valve body having inlet and outlet portions, mounting means, diaphragm means mounted on the mounting means, crimping means fixedly securing the diaphragm means and the mounting means to the valve body, tubular housing means secured to said diaphragm means for enclosing an expansible regulator chamber projecting from the valve body, said regulator chamber being in fluid communication with the outlet portion, valve means mounted in said valve body for establishing fluid communication between said inlet portion and the regulator chamber in response to displacement of the housing means in one direction, and adjustment means operatively mounted by the mounting means in enclosing relation to the housing means for imposing an adjustable bias on the housing means in said one direction opposed by the fluid pressure developed in said regulator chamber, said tubular housing means including an annular flange secured to said diaphragm means in enclosing relation to the valve means, and a removable end closure portion exposed through said adjustment means for engaging the valve means to establish said fluid communication between the inlet portion and the regulator chamber, said valve body including an annular recess portion and a passage portion projecting axially from said annular recess portion into said tubular housing means, said valve means being replaceably mounted in said passage portion for withdrawal from the housing means upon removal of the end closure portion thereof, said diaphragm means and said housing means presenting movable surfaces spaced from the recess portion and the passage portion for expansion of the regulator chamber, said adjustment means comprising, adjustably positioned means operatively mounted by the mounting means for accommodating movement of the housing means relative thereto and biasing means operatively mounted in surrounding relation to the valve means between the adjustably positioned means and the housing means for imposing said adjustable bias regulated in accordance with the position of the adjustably positioned means to open said valve means when the pressure in said regulator chamber decreases below a regulated value.

2. The combination of claim 1 including control means operatively mounted in spaced relation to the adjustment means, and actuator means operatively connected to the housing means and projecting from the adjustment means for actuation of the control means.

3. The combination of claim 1, including fixed volume chamber means mounted in said valve body in fluid communication with said inlet portion and filter passage means operatively connecting said fixed volume chamber means to the valve means for filtered flow of fluid between the inlet portion and the regulator chamber upon opening of the valve means.

4. The combination of claim 3 including selectively operable means operatively mounted in said passage means for cutting off fluid communication between the inlet portion and the regulator chamber.

5. The combination of claim 4, including line pressure supply means operatively connected to said selectively operable device for establishing fluid communication with said fixed volume chamber.

6. The combination of claim 5, including line pressure control means operatively mounted in said line pressure supply means for controlling admission of fluid from the inlet portion to the supply means in response to operation of said selectively operable means.

7. The combination of claim 1 including a second chamber in said value body, said inlet portion having at least two inlet ports for respectively supplying fluid under line pressure to both of said chambers.

8. The combination of claim 1, including the second chamber in said valve body and selectively operable means for controlling admission of fluid from the inlet portion to both of said chambers.

9. The combination of claim 1 including a second chamber in said valve body exhaust means operatively connected to said other of the regulator chamber for venting the pressure developed in the second chamber in response to a maximum pressure developed in said regulator chamber.

10. The combination of claim 1 including a second chamber in said valve body and exhaust means operatively connected to said valve means for venting said regulator chambers in response to a predetermined reduction in pressure in the second chamber.

11. The combination of claim 1 wherein the mounting means comprises an internally threaded member threadedly mounting said adjustably positioned means and having a flange portion axially spaced from the adjustably positioned means in clamped abutment with the diaphragm means.

References Cited by the Examiner

UNITED STATES PATENTS

| | | | |
|---|---|---|---|
| 2,615,287 | 10/1952 | Senesky | 137—505.42 |
| 2,876,793 | 3/1959 | Vanderpoel | 137—505.42 |
| 3,020,926 | 2/1962 | Browning | 137—507 X |
| 3,136,329 | 6/1964 | Issbricker | 137—505.25 X |
| 3,149,828 | 9/1964 | Schutmaat | 137—505.42 X |

ISADOR WEIL, *Primary Examiner.*

H. WEAKLEY, *Assistant Examiner.*